Nov. 24, 1942.  B. STECHBART  2,302,811
AUTOMATIC FIRE SHUTTER MECHANISM
Filed Sept. 16, 1940  4 Sheets—Sheet 1

INVENTOR
BRUNO STECHBART
BY *Robert F. Miehle, Jr.*
ATTY.

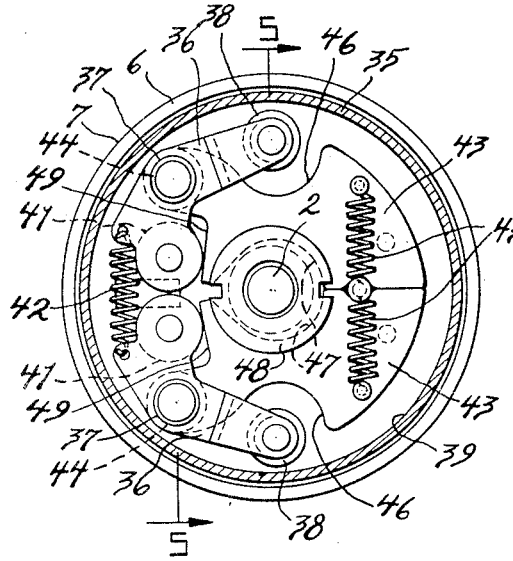
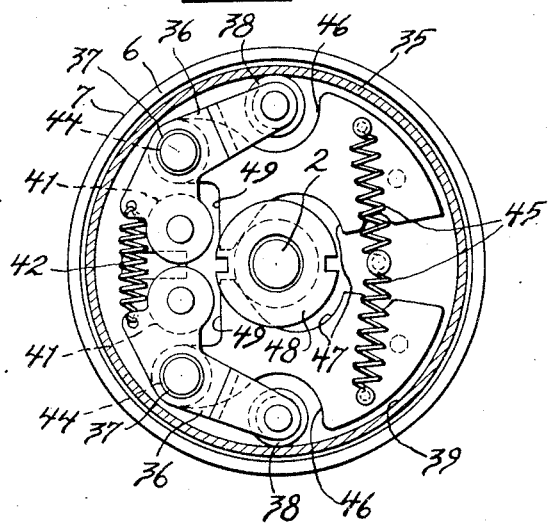
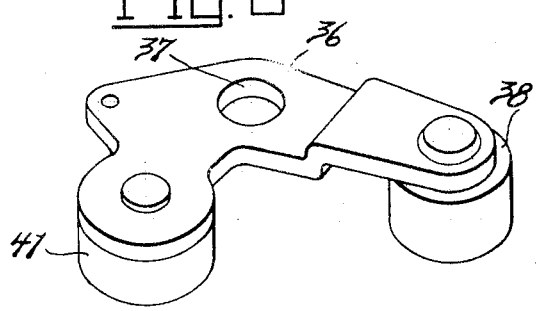
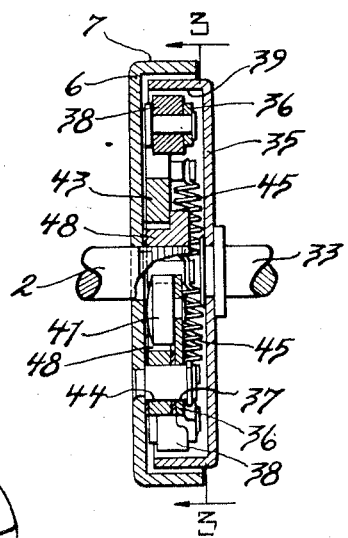
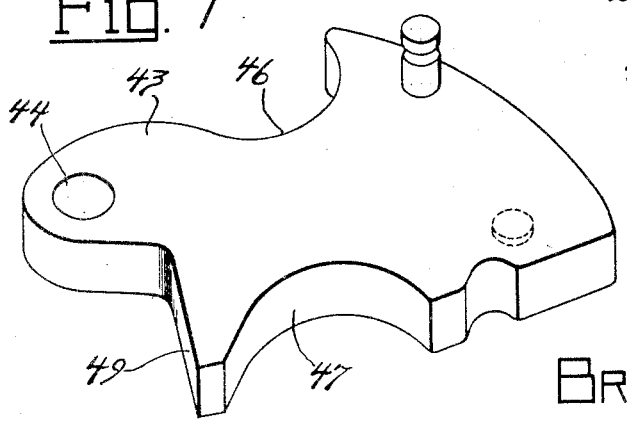
INVENTOR
BRUNO STECHBART

INVENTOR
BRUNO STECHBART
BY
ATTY.

Nov. 24, 1942. B. STECHBART 2,302,811
AUTOMATIC FIRE SHUTTER MECHANISM
Filed Sept. 16, 1940 4 Sheets-Sheet 4
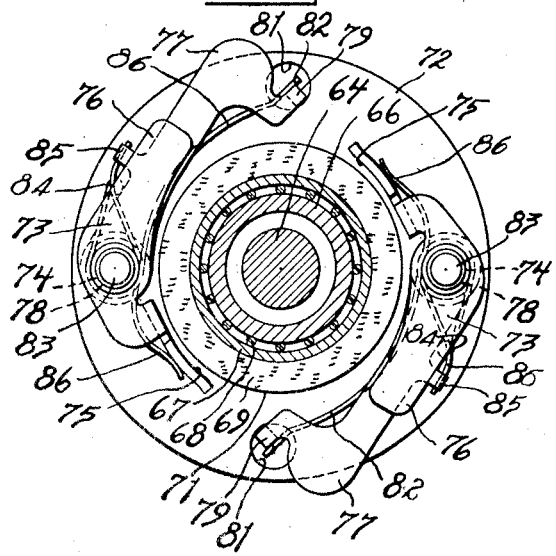
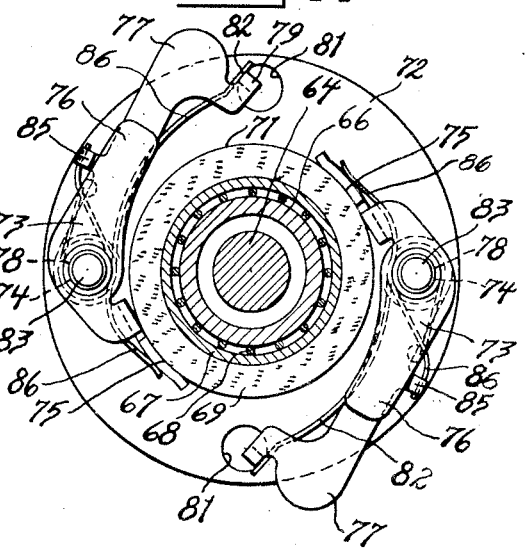
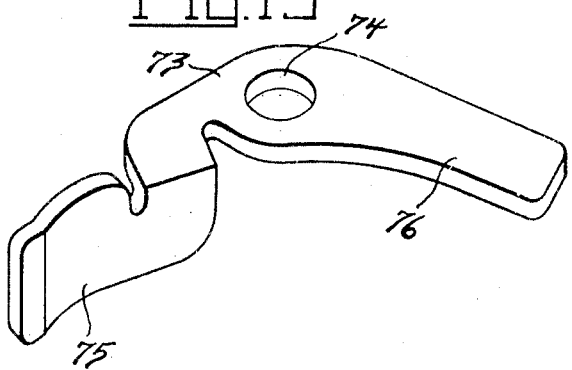
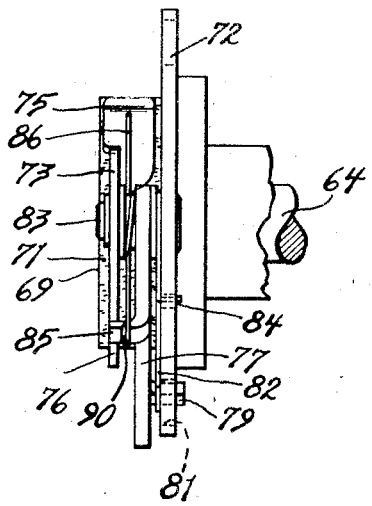
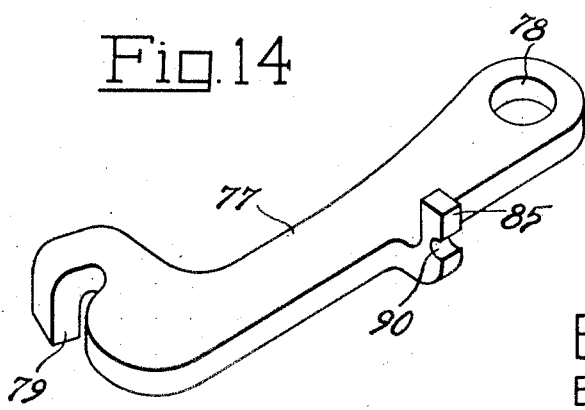
INVENTOR
BRUNO STECHBART
ATTY.

Patented Nov. 24, 1942

2,302,811

UNITED STATES PATENT OFFICE 2,302,811

AUTOMATIC FIRE SHUTTER MECHANISM

Bruno Stechbart, Chicago, Ill., assignor to The Bell & Howell Company, Chicago, Ill., a corporation of Illinois Application September 16, 1940, Serial No. 356,963

4 Claims. (Cl. 88—19.4)

My invention relates particularly to motion picture projecting machines and has for its general object the provision of a reliable and effective automatic fire shutter mechanism for the instant purpose of obstructing the projection light of a motion picture projecting machine at a low velocity or stopped condition of the projector mechanism to the end that the film at the projection aperture of the machine is not damaged by the heat from the projection light.

Another object resides in the provision of a governor controlled yielding friction clutch which is particularly adapted for the control of a fire shutter and the friction of which does not undesirably increase as the velocity of the driving member thereof increases.

With these objects in view, my invention consists in certain features of novelty in the construction, combination and arrangement of parts by which the said object and certain other objects, hereinafter appearing, are effected, all as fully described with reference to the accompanying drawings, and more particularly pointed out in the appended claims.

In the said drawings—

Figure 3 is an enlarged sectional view of the governor controlled yielding friction clutch of my invention, substantially on the line 3—3 of Fig. 5;

Figure 4 is a view similar to Figure 3, showing parts in different positions than those in which they are shown in Figure 3;

Figure 5 is a sectional view substantially on the line 5—5 of Figure 3;

Figure 6 is an enlarged perspective view of one of the friction clutch members involved in Figures 3, 4 and 5;

Figure 7 is an enlarged perspective view of one of the governor weight members involved in Figures 3, 4 and 5;

Figure 10 is an enlarged partial sectional view substantially on the line 10—10 of Figure 9;

Figure 11 is a view similar to Figure 10, showing parts in different positions than those in which they are shown in Figure 10;

Figure 12 is a side elevation of the structure of Figures 10 and 11;

Figure 13 is an enlarged perspective view of one of the friction clutch members involved in Figures 10, 11 and 12; and Figure 14 is an enlarged perspective view of one of the governor weight members involved in Figures 10, 11 and 12.

Figure 1:
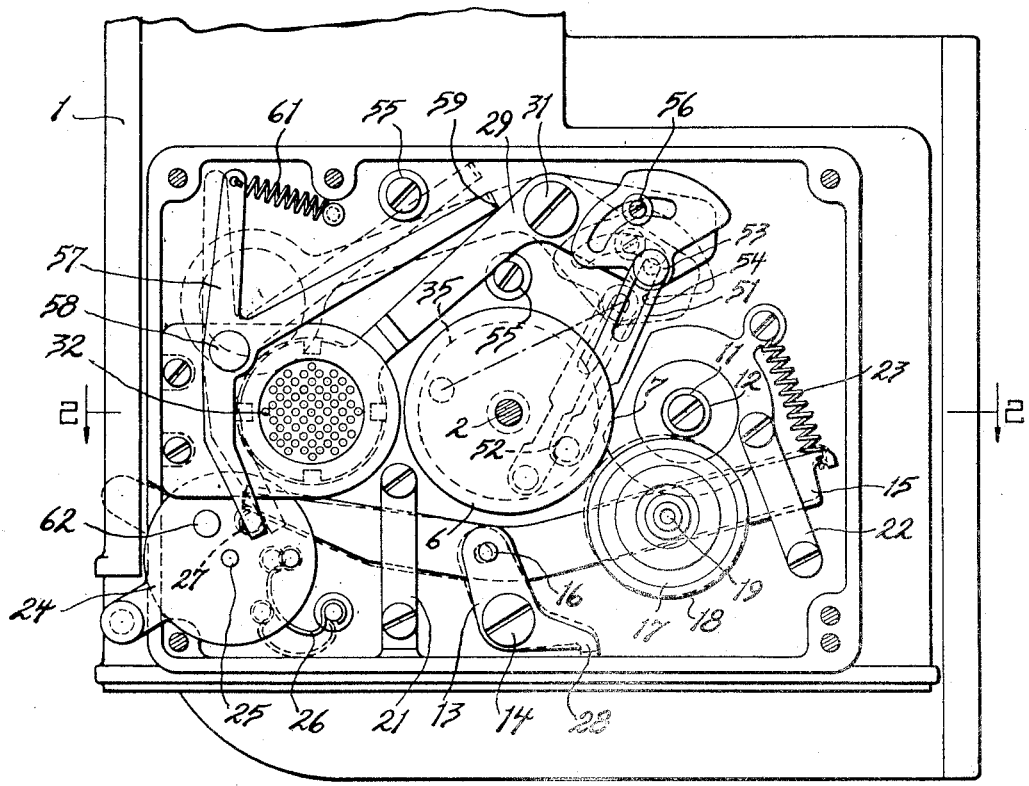
Figure 1 is a partial view in front elevation of a motion picture projecting machine embodying my invention, with parts removed and shown in section.

Referring to the Figures 1 to 7, inclusive, of the drawings, 1 designates the frame of a motion picture projecting machine, and a forwardly extending mechanism shaft 2 is rotatably mounted on this frame by means of bearings, of which one is shown at 3. The shaft 2 drives the projection mechanism of the machine, including a light shutter 4 and an intermittent film feed cam 5 secured on this shaft, and a clutch drive member in the form of a rearwardly facing drum 6 is also secured on the shaft 2 and provides an external friction drive surface 7.

A rearwardly extending motor or drive shaft 8, in parallelism with the shaft 2, is rotatably mounted on the frame 1 by means of bearings, of which one is shown at 9, and a drive member 11 is secured on the forward end of this shaft and provides an external friction drive surface 12.

A link 13 is pivotally mounted on the frame 1 in axial parallelism with the shafts 2 and 8, as designated at 14, and a lever 15 is intermediately pivoted, as designated at 16, on the link 13 in axial parallelism with the pivotal axis of the link. See particularly Figure 1. An intermediate drive member 17, providing an external drive surface 18, is rotatably mounted, as designated at 19, on the lever 15 on an axis parallel to the pivotal axis of the link 13 and spaced from the pivotal connection of the lever with the link. The drive member 17 is thus mounted for universal movement with the lever 15 in the plane of revolution thereof into and out of engagement with the primary drive member 11 and the clutch drive member 6 to form a releasable clutch drive therewith, the lever 15 being guided in its movement by guides 21 and 22. A spring 23 is operative on an end of the lever 15 to yieldably urge the drive member 17 into engagement with the drive members 6 and 11.

A manually actuated control member 24 is pivotally mounted on the frame 1, as designated at 25, and is yieldably maintained at opposite ends of its movement by an over center spring detent device, generally designated at 26. An eccentrically disposed stud 27 on the member 24 is engageable with the end of the lever 15 opposite that engaged by the spring 23 to tilt the lever 15 in opposition to this spring when the member 24 is moved to one end of its movement for disengaging the drive member 17 from the drive members 6 and 11 to stop operation of the projector mechanism. The link 13 is provided with a stop arm 28 engageable with the frame 1 to take the reaction of clutch releasing movement of the lever 15. Movement of the control member 24 to the other end of its movement permits engagement of the drive member 17 with the drive members 6 and 11 by means of the spring 23. The clutch disengaged positions of the drive member 17 and related parts are shown in full lines, and the clutch engaged positions thereof are shown in broken lines in Figure 1.

Thus, is provided a simple and effective releasable friction clutch drive for the projector mechanism, the drum or drive member 6 conveniently functioning for another purpose hereinafter appearing.

A shutter arm 29 is intermediately pivoted, as designated at 31, on the frame 1 on a rearwardly extending axis above the axis of the mechanism shaft 2, and one end of this arm is provided with a fire shutter 32, preferably partially obstructing the passage of light therethrough, as is usual with fire shutters, and the shutter is reciprocable, with pivotal movement of the arm 29, into and out of operative or light obstructing position. The operative position of the shutter is shown in full lines and the inoperative position thereof is shown in broken lines in Figure 1.

Figure 2:
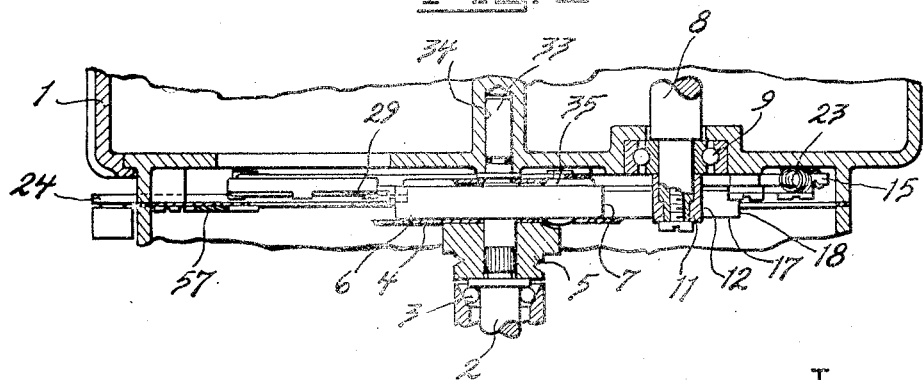
Figure 2 is a partial sectional view of the same, substantially on the line 2—2 of Figure 1.
Figure 8:
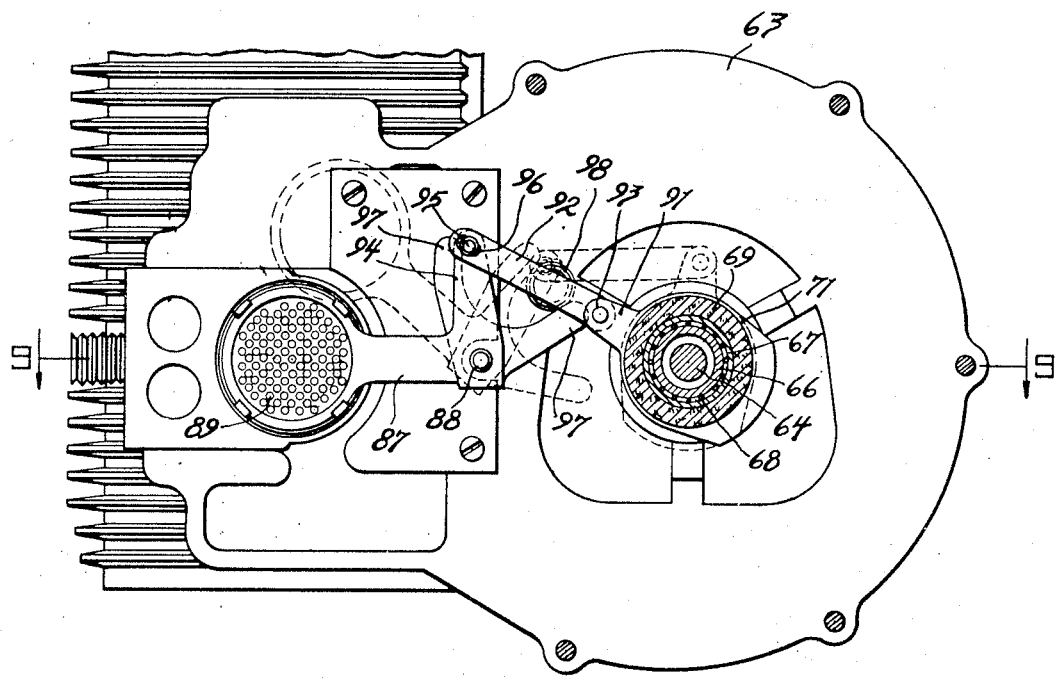
Figure 8 is a partial view in front elevation of a motion picture projecting machine embodying another form of my invention, with parts removed and shown in section.
Figure 9:
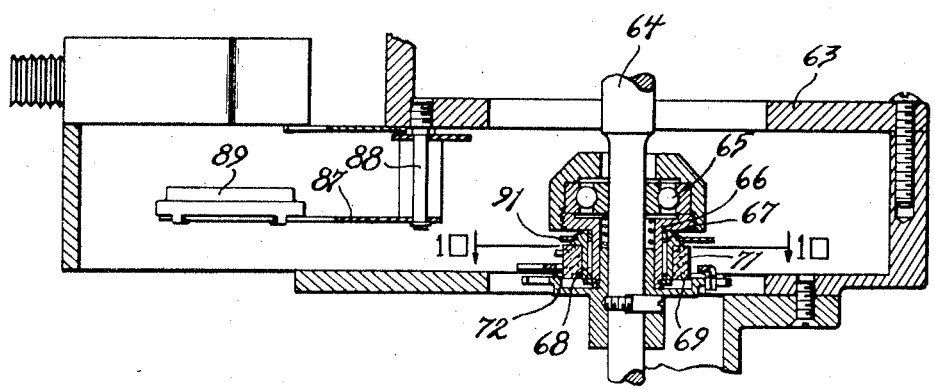
Figure 9 is a partial sectional view of the same, substantially on the line 9—9 of Figure 8.

A short shaft 33 is rotatably on the frame 1, as designated at 34 in Figure 2, in coaxial relation with the shaft 2, and a driven clutch member in the form of a forwardly facing drum 35 is secured on this shaft for rotation therewith and extends into the drum member 6. See Figures 3, 4 and 5. A pair of right and left clutch arms 36 are disposed within the drums 6 and 35 and are intermediately pivotally mounted, as designated at 37, on and eccentrically of the axis of the drums respectively on spaced axes disposed on one side of an axial plane of the drums. Corresponding portions of these arms extend from their pivotal axes toward the aforesaid axial plane and are provided at their outer ends with friction rollers 38 frictionally engageable with a radially internally facing friction clutch surface 39 of the drum 35 at diametrically opposite points, corresponding with the aforesaid axial plane, to provide a friction clutch drive from the drum 6 to the drum 35, these rollers being disengageable from the drum 35. See Figures 3, 4, 5 and 6.

The other portions of the arms 36 extend toward each other and are provided with counterbalance weights 41 opposing centrifugal actuation of the arms, and a tension spring 42 is connected with the arms 36 and yieldably urges the arms to engage the friction rollers 38 with the surface 39 of the drum 35 to form a yielding friction drive between the drums 6 and 35.

A pair of right and left centrifugally actuated weight members 43 are disposed within the drums 6 and 35 and are pivotally mounted, as designated at 44, on and eccentrically of the axis of the drum 6 respectively on spaced axes coaxial respectively with the pivotal mountings 37 of the clutch arms 36 and accordingly disposed at said side of the aforementioned axial plane of the drums 6 and 35. These weight members extend from their pivotal axes on opposite sides respectively of the axis of the drums 6 and 35 and across the aforementioned axial plane to the other side thereof. Springs 45 yieldably urge the weight members 43 in opposition to centrifugal actuation thereof. See Figures 3, 4, 5 and 7.

The weight members 43 are provided with edge recesses 46 for clearance of the friction rollers 38 and are provided with edge recesses 47 for clearance of the shaft 2 and a securing nut 48 thereon, the latter recesses being engageable with the nut 48 to provide stop means limiting centrifugal actuation of the weight members, as shown in Figure 4. The weight members 43 are also provided with abutment surfaces 49 engageable with the counterbalance weights 41 of the clutch arms 36 to provide one way connections between the clutch arms and the weight members operative to effect disengagement of the clutch arms from the drum 35 with positioning of these weight members by the springs 45.

At a low velocity or stopped condition of the driving clutch drum 6, the weight members 43 are retracted by the springs 45, see Figures 3 and 5, and the abutment surfaces 49, engaging the counterbalance weights of the clutch arms 36, position the clutch arms in clutch released position out of engagement with the driven clutch drum 35, the spring 42 being overcome in this condition. As the velocity of the driving clutch drum 6 increases, see Figure 4, the weight members 43 are centrifugally actuated in opposition to the springs 45 and the abutment surfaces 49 are disengaged from the counterbalance weights 41 with the result that the spring 42 actuates the clutch arms 36 into clutch-engaged positions for the driving of the driven clutch drum 35. Accordingly, the pressure between the friction clutch members cannot become excessive with resulting excessive clutch driving friction as the velocity of the driving drum 6 increases, the counterbalancing weights 41 also tending toward this end.

A link 51 is pivotally connected at spaced points thereon with and eccentrically of the driven clutch drum 35, as designated at 52, and with an end portion of the shutter arm 29 by means of a stud 53 on the shutter arm and slidably and pivotally engaging a longitudinally extending slot 54 on this link. See Figures 1 and 2. As so connected with the shutter arm, the driven clutch drum 35 is operative on the shutter arm to actuate the shutter arm from operative position, as shown in full lines in Figure 1, to inoperative position, as shown in broken lines in Figure 1, with movement of the drum 35 to either end of an angular movement thereof from an intermediate position of said angular movement, thus providing for control in both directions of drive of the projector mechanism, as is indicated in Figure 1. The slot 54, engaged with the stud 53, provides a lost motion connection permitting the drum 35 to gather momentum with a view toward preventing stalling of this drum.

Movement of the shutter arm 29, which is yieldably urged into operative position, and of the clutch drum 35, is limited by stops 55 on the frame 1 and engaged by the shutter arm, and the shutter arm is provided with an adjustable partially balancing counterweight device, generally designated at 56.

An arm 57 is pivotally mounted on the frame 1, as designated at 58, and is engageable, as designated at 59, with the shutter arm 29 to actuate the shutter arm into operative position. A spring 61 actuates the arm 57 in the direction to actuate the shutter arm into operative position. An eccentrically disposed stud 62 on the clutch control member 24 is engageable with the arm 57 to actuate the same out of engagement with the shutter arm 29 when the clutch control member is in clutch-engaged position, as shown in broken lines in Figure 1. When the clutch control member is in clutch-disengaged position, the stud 62 is disengaged from the arm 57, thus permitting the spring 61 to act on the shutter arm 29 through the arm 57 to facilitate movement of the shutter arm into operative position when the driving clutch is disengaged, as shown in full lines in Figure 1.

Referring to Figures 8 to 14, inclusive, of the drawings, 63 designates the frame of a motion picture projecting machine, and a forwardly extending motor and projection mechanism drive shaft 64 is rotatably mounted on this frame by means of bearings, one of which is shown at 65. See Figures 8 and 9. A sleeve 66 is secured with the frame 63 in concentric relation with and surrounding a portion of the shaft 64, and another sleeve 67 is rotatably mounted on the exterior of the sleeve 66 in concentric relation with the shaft 64 by means of a roller bearing 68. A ring 69 of friction material such as cork is secured on the exterior of the rotatable sleeve 67 and provides a radially externally facing friction clutch surface 71.

A clutch drive disk member 72 is secured on the shaft 64 for rotation therewith. A pair of clutch arms 73, external of the clutch surface 71, are intermediately pivotally mounted, as designated at 74, on and eccentrically of the axis of the disk and respectively on axes disposed in diametrically opposite relation with respect to the axis of the disk. See Figures 10, 11, 12 and 13. Corresponding portions of these arms extend from their pivotal axes and are formed to provide friction surfaces 75 engageable with the clutch surface 71 at diametrically opposite points to provide a friction clutch drive from the disk member 72 to the driven clutch member or sleeve 67, these arms being disengageable from the clutch surface 71. The other portions of the arms 73 extend from their pivotal axes in generally opposite relation with the portions 75 thereof, as designated at 76, and provide counter balance weights opposing centrifugal actuation of the arms.

A pair of centrifugally actuated weight members 77, external of the clutch surface 71, are pivotally mounted, as designated at 78, on and eccentrically of the axis of the disk 72 and respectively on axes disposed in diametrically opposite relation with respect to the axis of the disk and coaxial respectively with the pivotal mountings of the clutch arms 73. See Figures 10, 11, 12 and 14. Pivotal movement of the weight members 77 is limited by lateral lugs 79 on the weight members and extending into bores 81 of the disk 72.

U-shaped springs 82 embrace studs 83 of the pivotal mountings of the clutch arms 73 and weight members 77, and corresponding ends thereof are engaged with the disk 72, as designated at 84. The other ends of these springs engage, respectively, the lugs 79 of the weight members 77 and yieldably urge the weight members in opposition to centrifugal actuation thereof.

The weight members 77 are provided with abutment lugs 85 engageable respectively with the counter balance portions 76 of the correspondingly pivoted clutch arms 73 to provide one-way connections between the weight members and the clutch arms operative to effect disengagement of the clutch arms from the driven clutch member with positioning of the weight members by the springs 82.

Springs 86 have their intermediate portions coiled respectively about the studs 83, and corresponding ends of these springs are engaged respectively with the corresponding clutch arms 73, and the other ends of these springs are engaged respectively in grooves 90 of the lugs 85 of corresponding weight members 77 to yieldably urge the clutch members into clutch-engaged position.

At a low velocity or stopped condition of the clutch drive disk 72, the weight members 77 are retracted by the springs 82, see Figure 10, and the abutment lugs 85, engaging the clutch arms, position the clutch arms in clutch-released position out of engagement with the clutch surface 71, the springs 86 being overcome in this condition. As the velocity of the clutch drive disk increases, see Figure 11, the weight members 77 are centrifugally actuated in opposition to the springs 82, and the lugs 85 are disengaged from the clutch arms, with the result that the springs 86 actuate the clutch arms into clutch-engaged positions. Accordingly, the pressure between the friction clutch members cannot become excessive with resulting excessive clutch driving friction as the velocity of the clutch drive member increases, the counterbalancing of the clutch arms also tending toward this end.

A shutter arm 87 is pivoted, as designated at 88, on the frame 63 on a rearwardly extending axis, and one end of this arm is provided with a fire shutter 89 which is reciprocable, with pivotal movement of the arm 87, into and out of operative or light obstructing position. The shutter arm is yieldably urged into operative position.

A counterbalanced arm 91 is secured on the clutch-driven sleeve 67, and a link 92 is pivotally connected at spaced points thereon with the arm 91 and eccentrically of the driven clutch member, as designated at 93, and with an arm portion 94 of the shutter arm 87 by means of a stud 95 on this arm portion and slidably and pivotally engaging a longitudinally extending slot 96 on this link. Movement of the shutter arm 87 is limited by stop fingers 97 thereon engaging a stud 98 on the frame 63.

The structure of Figures 8 to 14, inclusive, functions similarly to the corresponding structure of Figures 1 to 7, inclusive, and its functioning is obvious in view of the previous description of the functioning of the structure of Figures 1 to 7, inclusive.

While I have thus described my invention, I do not wish to be limited to the precise details described, as changes may be readily made without departing from the spirit of my invention, but having thus described my invention, I claim as new and desire to secure by Letters Patent the following:

1. In a device of the character described, the combination with a rotatable drive member and a releasable clutch for driving the same, of a fire shutter movable into and out of operative position, a centrifugal governor controlled yielding friction clutch driven from said drive member, means under the control of said last-mentioned clutch and operative for rendering said shutter operative and inoperative respectively with low and high speed velocity conditions of said drive member, additional means operative to actuate said shutter into operative position, and means operative to render said additional mentioned means operative and inoperative respectively with disengagement and engagement of said first mentioned clutch.

2. In a device of the character described, the combination with a rotatable drive member and a releasable clutch for driving the same, of a fire shutter movable into and out of and yieldably urged into operative position, a centrifugal governor controlled friction clutch driven from said drive member, means under the control of said last mentioned clutch and operative for rendering said shutter operative and inoperative respectively with low and high speed velocity conditions of said drive member, additional yieldably urged means operative to actuate said shutter into operative position, and means controlled with said first mentioned clutch for rendering said additional means operative and inoperative respectively with disengagement and engagement of said first mentioned clutch.

3. In a device of the character described, the combination with a rotatable drive member and a releasable clutch for driving the same, of a pivotally mounted fire shutter movable into and out of operative position, a centrifugal governor controlled friction clutch driven from said drive member, means under the control of said last mentioned clutch and operative for rendering said shutter operative and inoperative respectively with low and high speed velocity conditions of said drive member, a pivoted lever engageable with said shutter to actuate said shutter into operative position, a spring operative on said lever to actuate said shutter into operative position, a movable control member connected with said driving clutch for engaging and disengaging the same, releasable means for maintaining said control member at opposite ends of its movement, and means operative between said control member and said lever operative to render said lever operative and inoperative respectively with disengagement and engagement of said driving clutch.

4. In a device of the character described, the combination with a rotatable primary drive member provided with an external friction drive surface, of a fire shutter movable into and out of operative position, a centrifugal governor and a friction clutch controlled thereby including a rotatable drive member disposed in parallelism with said primary drive member and provided with an external friction drive surface and a driven member operatively connected with said fire shutter for controlling the same, a rotatable intermediate drive member arranged in parallelism with said drive members and provided with an external drive surface, a lever on which said intermediate drive member is rotatably mounted, a mounting carrying said drive member for movement to engage and disengage said intermediate drive member with said primary and clutch drive members comprising a pivotally mounted link pivotally connected with said lever on an axis parallel to the pivotal axis of said link and spaced from the axis of said intermediate drive member, a spring yieldably urging said lever in the direction to engage said intermediate drive member with said primary and clutch drive members, and a control member operable into and out of position to tilt said lever in opposition to said spring.

BRUNO STECHBART.